(12) United States Patent
Krieger et al.

(10) Patent No.: US 9,043,602 B1
(45) Date of Patent: May 26, 2015

(54) GENERATING AND USING EPHEMERAL IDENTIFIERS AND MESSAGE INTEGRITY CODES

(71) Applicant: Google Inc., Mountain View, CA (US)

(72) Inventors: Ken Krieger, Jackson, WY (US); Michel Weksler, El Cerrito, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/559,454

(22) Filed: Dec. 3, 2014

Related U.S. Application Data

(60) Provisional application No. 62/009,998, filed on Jun. 10, 2014, provisional application No. 62/010,058, filed on Jun. 10, 2014.

(51) Int. Cl.
| | |
|---|---|
| *H04L 9/12* | (2006.01) |
| *H04L 29/06* | (2006.01) |
| *H04W 12/06* | (2009.01) |
| *H04L 9/32* | (2006.01) |

(52) U.S. Cl.
CPC ........... *H04L 63/0876* (2013.01); *H04W 12/06* (2013.01); *H04L 63/123* (2013.01); *H04L 9/3297* (2013.01)

(58) Field of Classification Search
None
See application file for complete search history.

(56) References Cited

U.S. PATENT DOCUMENTS

| | | | |
|---|---|---|---|
| 8,059,821 B1* | 11/2011 | Begen | 380/286 |
| 2004/0228360 A1* | 11/2004 | Bae et al. | 370/432 |
| 2010/0131756 A1* | 5/2010 | Schneider | 713/155 |
| 2012/0036567 A1* | 2/2012 | Senese et al. | 726/7 |
| 2014/0040991 A1* | 2/2014 | Potonniee et al. | 726/4 |
| 2014/0133656 A1* | 5/2014 | Wurster et al. | 380/270 |
| 2014/0270163 A1* | 9/2014 | Merchan et al. | 380/46 |
| 2014/0370879 A1* | 12/2014 | Redding et al. | 455/419 |

\* cited by examiner

*Primary Examiner* — Michael R Vaughan
(74) *Attorney, Agent, or Firm* — Dority & Manning, P.A.

(57) ABSTRACT

Systems and methods for generating and using ephemeral identifiers are provided. One example method includes determining, by one or more computing devices, a current time-count. The method includes determining, by the one or more computing devices, a time-modified identifier based at least in part on a static identifier and the current time-count. The method includes determining, by the one or more computing devices, an ephemeral identifier based at least in part on the time-modified identifier and a rotation key. One example system includes a plurality of beacon devices, at least one observing entity, and at least one verifying entity.

9 Claims, 8 Drawing Sheets

Message Integrity Code Generation on Beacon Device

US 9,043,602 B1

GENERATING AND USING EPHEMERAL IDENTIFIERS AND MESSAGE INTEGRITY CODES

PRIORITY CLAIM

The present application is based on and claims priority to U.S. Provisional Application 62/009,998 having a filing date of Jun. 10, 2014 and U.S. Provisional Application 62/010,058 having a filing date of Jun. 10, 2014, which are both incorporated by reference herein.

FIELD

The present disclosure relates generally to generating and using ephemeral identifiers and message integrity codes. In particular, the present disclosure is directed to the generation and use of ephemeral identifiers and message integrity codes in the context of a system that features a plurality of beacon devices, at least one observing entity, and at least one verifying entity.

BACKGROUND

Certain systems exist in which a first device provides (e.g. broadcasts using a short range wireless communication technology) information that publicly identifies the first device. A second device can receive the information and use the knowledge of the identity of the first device and proximity to the first device for various purposes, including communication, asset tracking, retail identification, safety, localization, etc. This configuration can be useful in fully public and open settings in which the identity and presence of the first device does not need to be concealed for any reason.

However, in many situations, it may be undesirable for the identity and presence of the first device to be fully transparent and publicly available. Instead, it may be desirable that only certain individuals or devices be able to identify the first device or otherwise receive specific information associated with the first device.

However, this configuration may be vulnerable to impersonation or other spoofing attacks. For example, because the first device publicly broadcasts its identifying information, a fraudulent device can record and replay the broadcasted identify information, thereby tricking the second device into believing that the fraudulent device is the first device. This vulnerability to impersonation can greatly damage the efficacy of the system.

Further, in some systems, the first device may be unable to or otherwise prohibited from performing more complex communications with other devices to validate its interactions.

Therefore, use of obscured identifiers and message integrity codes that authenticate the identity of the broadcasting device may be desirable. In particular, time-based ephemeral identifiers and message integrity codes may be particularly advantageous.

SUMMARY

Aspects and advantages of the present disclosure will be set forth in part in the following description, or may be obvious from the description, or may be learned through practice of embodiments of the present disclosure.

One example aspect of the present disclosure is directed to a computer-implemented method for authenticating beacon devices. The method includes receiving, by one or more computing devices, a static identifier and a message integrity code from an observing entity. The observing entity previously received the static identifier and the message integrity code from a beacon device. The message integrity code is a time-varied obscuration of the static identifier associated with the beacon device. The operations include determining, by the one or more computing devices, a validity of the message integrity code by matching the message integrity code versus a plurality of expected message integrity codes. When the message integrity code is determined to be valid, the operations include providing, by the one or more computing devices, the observing entity with an authentication of the beacon device.

Another example aspect of the present disclosure is directed to a computer-implemented method for generating ephemeral identifiers. The method includes determining, by one or more computing devices, a current time-count. The method includes determining, by the one or more computing devices, a time-modified identifier based at least in part on a static identifier and the current time-count. The method includes determining, by the one or more computing devices, an ephemeral identifier based at least in part on the time-modified identifier and a rotation key.

Another example aspect of the present disclosure is directed to a system for using ephemeral identifiers. The system includes a plurality of beacon devices. A plurality of static identifiers are respectively associated with the plurality of beacon devices. Each of the plurality of beacon devices is configured to periodically determine an ephemeral identifier based on its respective static identifier and a current time-count. The system includes an observing entity configured to receive a first ephemeral identifier from a first beacon device of the plurality of beacon devices. The system includes a verifying entity configured to receive the first ephemeral identifier from the observing entity and determine an identity of the first beacon device by locating the first ephemeral identifier in a pre-computed ephemeral identifier cache. The first ephemeral identifier is a time-varied obscuration of the static identifier associated with the first beacon device. The first ephemeral identifier was generated using an obscuring function known only to the first beacon device and the verifying entity, such that the observing entity cannot compute the identity of the first beacon device independent from communication with the verifying entity.

These and other features, aspects, and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling description of the present disclosure, directed to one of ordinary skill in the art, is set forth in the specification, which makes reference to the appended figures, in which.

DETAILED DESCRIPTION

Overview

Figure 1:
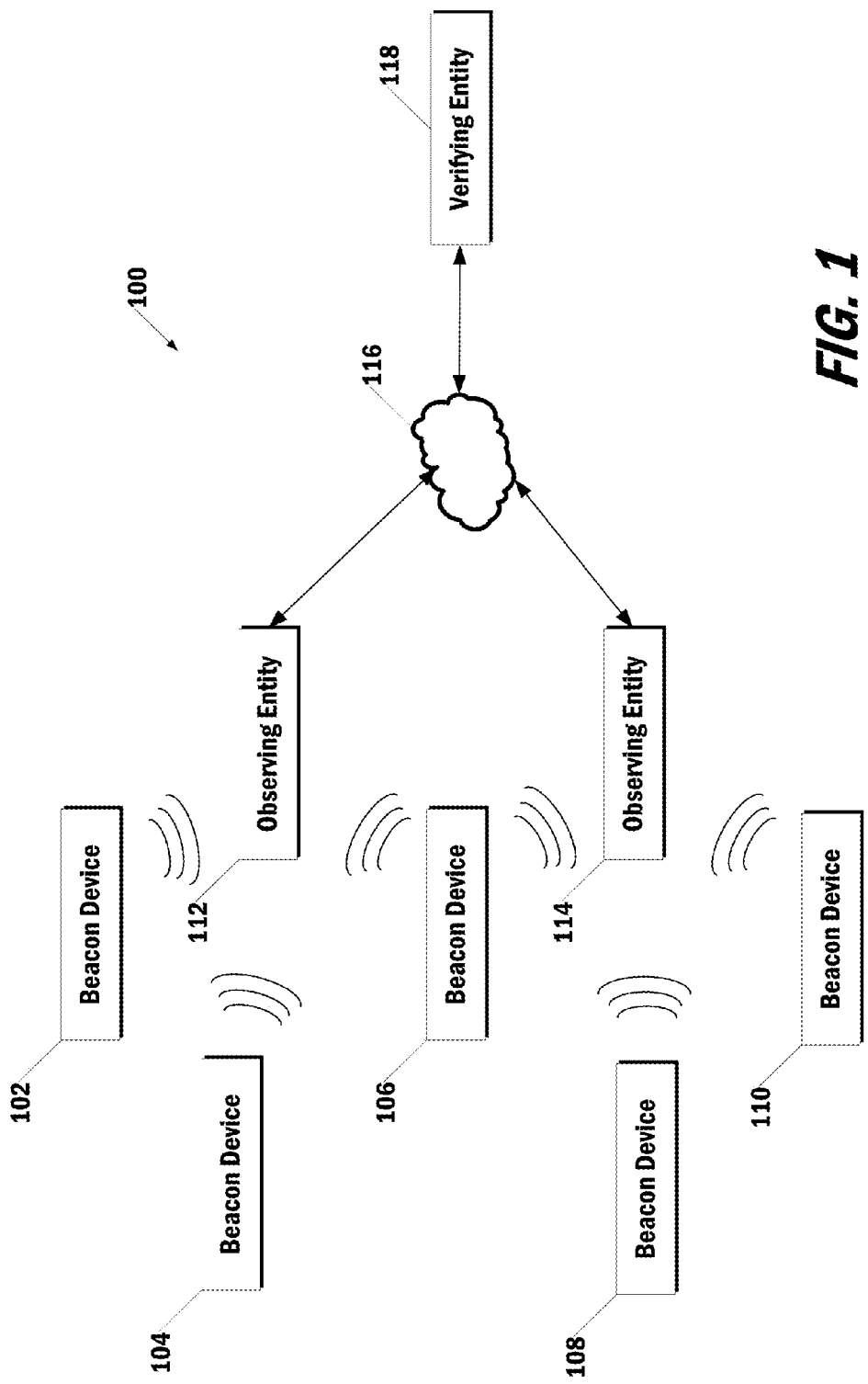
FIG. 1 depicts an example system according to an example embodiment of the present disclosure.

Generally, the present disclosure is directed to systems and methods for generating and using ephemeral identifiers and message integrity codes. One example system can include a plurality of beacon devices that periodically broadcast (e.g. using a short range wireless communication technology such as, for example, Bluetooth low energy technology) a message, signal, and/or advertising frame that contains one or more of an ephemeral identifier, a static identifier, and a message integrity code. In particular, each beacon device can have an assigned static identifier and can periodically implement a time-based obscuration algorithm to transform its static identifier into an ephemeral identifier or a time-specific message integrity code. The system can further include an observing entity capable of receiving broadcasts from the beacon devices. When the observing entity receives a message, signal and/or an advertising frame from a particular beacon device, the observing entity can transmit the received ephemeral identifier, static identifier, message integrity code, or combinations thereof to a central verifying entity in order to learn and/or authenticate the identity of or other information associated with the particular beacon device.

More particularly, the obscuration algorithm can leverage one or more shared secrets that are known only to each beacon device and the verifying entity. The obscuration algorithm can include various forms of encryption, reversible obscurations, non-reversible obscurations (e.g. hash functions), permutations, or other methods or techniques for obscuring data. Generally, the obscuration algorithm should be repeatable in the sense that the algorithm should provide an identical output when given identical inputs. Therefore, although the ephemeral identifier may be publicly broadcasted, the observing entity cannot compute the identity of a particular beacon device independent from communication with the verifying entity. In some embodiments, the ephemeral identifiers may be considered pseudo-random sequences of identifiers. Similarly, a message integrity code can be used by a central verifying entity to authenticate the use of a static identifier in a frame, message, or other signal emitted by the beacon device.

According to an aspect of the present disclosure, each beacon device can periodically implement a time-based obscuration algorithm to transform its static identifier into an ephemeral identifier and/or a time-specific message integrity code. In some embodiments, each beacon device can generate each ephemeral identifier or message integrity code by determining a current time-count; determining a time-modified identifier based at least in part on a static identifier and the current time-count; and determining the ephemeral identifier or message integrity code based at least in part on the time-modified identifier and a rotation key.

As an example, the current time-count of the beacon device can be determined by obtaining the current time-count from a time-based counter that is included in the beacon device. The time-based counter can increment the time-count over time (e.g. can increment the time-count once per second or other designated interval of incrementation). The interval at which the time-based counter increments the time-count can be a shared secret between the beacon device and the verifying entity, so that the verifying entity is able to predict with reasonable accuracy the current time-count at a beacon device at a given time, while devices that do not have knowledge of the interval of incrementation may be unable to do so.

In some embodiments, the time-based counter can increment the time-count by a predetermined increment quanta per instance of incrementation. The increment quanta can be a number that is not equal to one. The increment quanta can be a shared secret between the beacon device and the verifying entity, so that the verifying entity is able to predict with reasonable accuracy the current time-count at a beacon device at a given time, while devices that do not have knowledge of the increment quanta may be unable to do so.

The beacon device can also use a rotation rate to define how often the beacon device should generate a new ephemeral identifier or message integrity code. By extension, the rotation rate can also be used to define a period of time for which a given ephemeral identifier or message integrity code represents a respective valid identification or authentication code for the broadcasting beacon device.

Furthermore, in some embodiments, the rotation rate can include a certain amount of jitter. In particular, by adding a random or pseudo-random jitter to the exact timing of the rotation of the ephemeral identifiers or message integrity codes, it can be made more difficult for an entity to use time signatures (e.g. rotation rate) as identifying information associated with a particular beacon device.

As such, when a new ephemeral identifier or message integrity code is to be generated according to the current time and rotation rate, the current time-count of the time-based counter can be read or otherwise obtained. For example, a latch tool can be used to capture the particular time-count of the counter at a given time. The rotation rate can also be a shared secret between the beacon device and the verifying entity, so that the verifying entity is able to predict with reasonable accuracy when and how often the beacon device will be generating a new ephemeral identifier or message integrity code, while devices that do not have knowledge of the rotation rate may be unable to do so.

Thus, the beacon device and the verifying entity can have a shared sense of time that operates according to a unique time scheme. In particular, in some embodiments, using the above time features, time-counts used to generate message integrity codes can always be unique (e.g. not reused) and the time-count can always be increasing or otherwise moving in the same direction.

Once the current time-count has been obtained, it can be used along with the static identifier to generate a time-modified identifier. As an example, in some embodiments, the time-modified identifier can be obtained by performing an exclusive-or operation with respect to the current time-count and the static identifier. Thus, in such embodiments, the current time-count can be represented by data having the same bit-size as the static identifier.

The time-modified identifier can then be used along with a rotation key to generate the ephemeral identifier or a message integrity code. As an example, the time-modified identifier and the rotation key can be input into an obscuring function to generate the ephemeral identifier or a message integrity code precursor. For example, the obscuring function can be a block cipher. For example, the block cipher can be an Advanced Encryption Standard 128-bit block cipher. A message integrity code precursor can then be combined with a mask using an AND function to generate the message integrity code. For example, in some embodiments, the mask can be used to select a subset or one or more portions of the message integrity code precursor to use as the message integrity code. Further, in some embodiments, the mask can be a shared secret between each beacon device and the verifying entity. In other embodiments, use of a mask may not be necessary.

The rotation key can be specific to each beacon device and can be a shared secret between each beacon device and the verifying entity. As such, given an ephemeral identifier or a message integrity code, only the beacon device and the verifying entity that have knowledge of the particular beacon device's rotation key will be able to unobscure or validate the ephemeral identifier or message integrity code, respectively, to obtain the time-modified identifier. Further, because the rotation key is specific to each beacon device, if one of the plurality of beacon devices become compromised or their information otherwise becomes publicly available, a malicious entity will be unable to generate fraudulently generate ephemeral identifiers or authenticable messages for any of the other non-compromised beacon devices.

Furthermore, in some embodiments, each beacon device can have a set of rotation keys that can be shared secrets between such beacon device and the verifying entity. For example, selection of one of the set of rotation keys at each instance of rotation key usage can be based on a shared sense of time or other means or communication between the verifying entity and the beacon device. Thus, by using a different rotation keys from the set over time, the sequence of emitted ephemeral identifiers or message integrity codes can be further protected against attack (e.g. an attempt to deduce the rotation key by analyzing the sequence of emitted identifiers or message integrity codes or otherwise reversing the obscuring function).

In some embodiments, the mask can be used to select a subset or a portion of the message integrity code precursor to use as the message integrity code. For example, in some embodiments, the message integrity code precursor can be a 16-byte value and the mask can be used to select 4-bytes worth of data from the message integrity code precursor to use as the message integrity code. Similar to the rotation key, in some embodiments, the mask can be a shared secret between each beacon device and the verifying entity.

In such fashion, a beacon device can periodically generate a new ephemeral identifier or message integrity code to include in its broadcasts. Further, because the verifying entity also has knowledge of the shared secrets and can predict the beacon time-based counter with reasonable accuracy, the verifying entity can independently generate and store ephemeral identifiers that will be used by each beacon device at any given point in time. Also, because the verifying entity has knowledge of the shared secrets and can predict the beacon time-based counter with reasonable accuracy, the verifying entity can independently generate expected message integrity codes that are expected to be used by each beacon device at any given point in time. In addition, because the ephemeral identifiers change over time, they can assist in protecting against impersonation by replay or other spoofing attacks.

The system can also include one or more observing entities that receive or overhear the broadcasts from the beacon devices. However, in some embodiments, because the observing entities are unable to unobscured or validate the respective ephemeral identifier or message integrity code, the observing entity will need to communicate with the verifying entity in order to respectively identify or authenticate the beacon device or obtain additional information associated with the beacon device. For example, the observing entity can relay the received ephemeral identifier or message integrity code to the verifying entity along with a device reception timestamp that indicates a time at which the observing entity received the ephemeral identifier or message integrity code. Alternatively or in addition to the device reception timestamp, the observing entity can also communicate its current location, an indication of any recently observed beacon devices, and/or other information that can be used by the verifying entity to assist in performing authentication functionality.

In other embodiments, the observing entity can locally perform some aspects of the verifying entity functionality or can have pre-received data from the verifying entity that allows the observing entity to identify the beacon device or at least to determine an appropriate response to receiving the beacon device broadcast absent precise identification of the beacon device or contemporaneous authentication of the message integrity code by the verifying entity.

According to an aspect of the present disclosure, in some embodiments, when the verifying entity receives an ephemeral identifier from an observing entity, the verifying entity can locate the received ephemeral identifier within an ephemeral identifier cache to obtain the static identifier associated with the beacon device that broadcasted the ephemeral identifier.

More particularly, as noted above, the verifying entity can pre-compute expected ephemeral identifiers that will be used by a given beacon device. As such, the verifying entity can generate an ephemeral identifier cache that contains a large number of ephemeral identifiers that will be used by the beacon devices over a significant period of time.

In some embodiments, for each entry of an ephemeral identifier stored in the ephemeral identifier cache, the static identifier and the rotation key for the corresponding beacon device can also be stored in or referenced by the entry in the ephemeral identifier cache. Thus, by locating the received ephemeral identifier in the cache, the verifying entity can obtain the static identifier for the corresponding beacon device.

In addition, in some embodiments, the device reception timestamp can be used as a hint to locate the ephemeral identifier more quickly. For example, the ephemeral identifiers can be organized within the ephemeral identifier cache according to their corresponding times of validity. Therefore, the cache can be searched around the time provided by the device reception timestamp to more quickly locate the ephemeral identifier within the cache.

Having identified the beacon device from which the observing entity received the ephemeral identifier, the verifying entity can provide information associated with the identified beacon device to the observing entity. For example, the information provided can include the identity of the beacon device, the precise location of the beacon device, semantic information associated with the beacon device (e.g. a name or other textual information or graphical information associated with the beacon device), or other information. Alternatively or in addition to providing the observing entity with information, the verifying entity can perform one or more operations in response to identifying the beacon device, including, as examples, adding the observing entity to a particular grouping of entities, modifying locally stored data, or adjusting a counter associated with analytics.

As another example, in some embodiments, the verifying entity can require that a plurality of received ephemeral identifiers match to a plurality of the expected ephemeral identifiers included in the cache in order to provide the observing entity with the additional information. For example, if all or some acceptable portion of the plurality of received ephemeral identifiers are able to be located within the cache, then the additional information can be provided to the observing entity.

According to an aspect of the present disclosure, in some embodiments, when the verifying entity receives a message integrity code from an observing entity, the verifying entity can determine the validity of the message integrity code and, therefore, authenticate the static identifier broadcasted by the beacon device along with the message integrity code.

As an example, when the verifying entity receives a static identifier and message integrity code, the verifying entity can use a similar obscuration scheme and knowledge of the shared secrets to generate a plurality of expected message integrity codes that are expected to be used by the beacon device associated with the received static identifier. The received message integrity code can then be matched against the expected message integrity codes. If a match is found, then the verifying entity can authenticate the beacon device's use of the static identifier to the observing entity.

As another example, the verifying entity can require that a plurality of received message integrity codes match to a plurality of expected message integrity codes in order to authenticate the static identifier. For example, a plurality of received message integrity codes can be matched against a given set of expected message integrity codes. If all or some acceptable portion of the plurality of received message integrity codes are members of the set, then the static identifier can be authenticated. In some embodiments, a probabilistic filter such as a Bloom filter can be used to perform set membership queries.

In further embodiments, the plurality of received message integrity codes can be required to match against a particular sequence of expected message integrity codes. For example, in some embodiments, the observing entity can have the ability (e.g. through the use of a Bloomier filter) to determine that a given received message integrity code is at a certain location n within an expected sequence. If the following received message integrity code is at location n+1 (and so on for a desired sequence length), then the static identifier can be authenticated locally without comprising any of the secrets that are shared between the beacon devices and the verifying entity.

Thus, providing local authentication using Bloomier filters as described above can allow for varying levels of authentication. In particular, the local use of Bloomier filters on the observing entity can allow probabilistic authentication. Alternatively, communication of the message integrity codes for validation by a verifying entity that has knowledge of the shared secrets can allow calculated authentication.

In some embodiments, the plurality of expected message integrity codes can be generated by, first, generating a plurality of expected time-modified identifiers by respectively performing an exclusive-or operation with respect to the static identifier and a plurality of expected time-counts included in a time-count list.

As an example, the plurality of expected time-counts included in the time-count list can be generated based at least in part on the device reception timestamp. For example, the verifying entity can use its shared knowledge of the particular time-keeping scheme of the beacon device associated with the static identifier to determine the beacon counter timecounts that such beacon will use to generate its message integrity codes within a window of time around the time indicated by the device reception timestamp.

The plurality of expected time-modified identifiers can then be respectively input into an obscuring function along with a rotation key associated with the static identifier to generate a plurality of expected message integrity code precursors. For example, the obscuring function can be a block cipher. For example, the block cipher can be an Advanced Encryption Standard 128-bit block cipher. The rotation key can be a shared secret specific to the beacon device associated with the static identifier.

An AND operation can then be respectively performed with respect to a mask and the plurality of expected message integrity code precursors to generate the plurality of expected message integrity codes. In some embodiments, the mask can be a shared secret specific to the beacon device.

In some embodiments, for each expected message integrity code generated by the verifying entity, the expected timecount used to generate such expected message integrity code can also be stored alongside and/or referenced by the corresponding expected message integrity code. Thus, by matching the received message integrity code with a generated expected message integrity code, the verifying entity can also obtain the expected time-count used to generate the expected message integrity code. Such expected time-count should be equivalent to the time-count used by the beacon device to generate the broadcasted message integrity code, thereby providing an indication of a current status of the beacon device's internal clock, as will be discussed further below.

The verifying entity can validate the received message integrity code by matching the message integrity code to one of the generated expected message integrity codes. In response to validating the message integrity code, the verifying entity can perform various operations and/or obtain additional information.

As an example, the verifying entity can authenticate the beacon device's use of the static identifier to the observing device and, in some embodiments, can provide further information associated with the authenticated beacon device to the observing entity. For example, the information provided can include the precise location of the beacon device, semantic information associated with the beacon device (e.g. a name or other textual information or graphical information associated with the beacon device), or other information. Alternatively or in addition to providing the observing entity with information, the verifying entity can perform one or more operations in response to authenticating the use of the static identifier, including, as examples, adding the observing entity to a particular grouping of entities, modifying locally stored data, or adjusting a counter associated with analytics.

In further embodiments of the present disclosure, the verifying entity can perform one or more security checks prior to or after identifying or authenticating the beacon device. As an example, the verifying entity can match the observing entity versus an access control list associated with the identified or authenticated beacon device or the received ephemeral identifier or message integrity code, respectively. For example, use of an access control list can allow the operator of the beacon device to control which observing entities are entitled to be provided by the verifying entity with the information associated with the beacon device (e.g. the identity of the beacon device) or which observing entities are entitled to be provided by the verifying entity with an authentication of the beacon device or the additional information associated with the beacon device.

Furthermore, because the ephemeral identifiers or message integrity codes used by a beacon device will change over time, the access control list may also specify when and for how long certain observing entities are entitled to receive the authentication and/or the information associated with the beacon device. In such fashion, verifying entities can be capable of empowering specified observing entities to recognize ephemeral identifiers or receive authentication of message integrity codes for a defined time interval without compromising privacy before or after this interval.

As another example, in some embodiments, the verifying entity can unobscure the ephemeral identifier to obtain a time-count used by the beacon device to generate the ephemeral identifier. The verifying entity can then determine a time difference between the time-count used by the beacon device to generate the ephemeral identifier and a device reception timestamp also received from the observing entity. If the time difference exceeds a threshold value (e.g. the rotation rate), then the observing entity may be denied the information associated with the beacon device.

As another example, in some embodiments, the verifying entity can unobscure the ephemeral identifier to obtain a time-count used by the beacon device to generate the ephemeral identifier. The verifying entity can then determine a time difference between the time-count used by the beacon device to generate the ephemeral identifier and a device reception timestamp also received from the observing entity. If the time difference exceeds a threshold value (e.g. the rotation rate), then the observing entity may be denied the information associated with the beacon device.

As another example, in some embodiments, the verifying entity can identify the expected time-count that was used to generate the expected message integrity code to which the received message integrity code was matched. The verifying entity can then determine a time difference between the expected time-count and the device reception timestamp also received from the observing entity. If the time difference exceeds a threshold value (e.g. the rotation rate), then the observing entity may be denied the authentication of the beacon device and/or the additional information associated with the beacon device.

As yet another example, if a time difference between the current time and the device reception timestamp exceeds a threshold value, then the observing entity's reception of the ephemeral identifier or message integrity code may be designated as stale and the verifying entity may deny access to the authentication of the beacon device and/or the additional information associated with the beacon device.

As another example, in some embodiments of the present disclosure, the verifying entity can create a hole in a list of ephemeral identifiers, static identifiers, and/or message integrity codes that the verifying entity is willing to process/validate. Thus, the verifying entity can create a verifier-mediated access control list as well. These techniques can be used as a means for limiting access to beacon device information and/or identities or authentication to only occur during certain times (e.g. business hours) or as a means to selectively turn off verification/authentication functionality in the case of a denial of service attack. For example, if the verifying entity receives more than a threshold number of requests to process or authenticate against a particular ephemeral or static identifier or message integrity code, then the verifying entity can delete the particular ephemeral or static identifier or message integrity code from the list and, therefore, no longer provide verification/authentication for the particular ephemeral identifier, static identifier, corresponding beacon device for a certain period of time, or message integrity code combination.

In yet further embodiments of the present disclosure, the verifying entity can perform operations to address beacon device clock drift. As an example, in some embodiments, the verifying entity can maintain a beacon clock correction factor for each of the beacon devices. The beacon clock correction factor for each beacon device can describe an offset between the clock of the verifying entity and the clock or counter of such beacon device. The beacon clock correction factor can be a single value or can be a complex function that provides a time-varying relationship (e.g. includes a scaling factor).

In some embodiments, the beacon clock correction factor can be updated by a verifying entity based at least in part on an ephemeral identifier or a message integrity code received by an observing entity and relayed to the verifying entity and the device reception timestamp for the reception of the ephemeral identifier by the observing entity. As an example, updating the beacon clock correction factor can include unobscuring the ephemeral identifier to obtain a time-count used by the beacon device to generate the ephemeral identifier. The beacon clock correction factor can be updated based at least in part on a comparison of the unobscured time-count with the device reception timestamp.

More particularly, unobscuring the ephemeral identifier can include obtaining the static identifier and a rotation key associated with the beacon device from the ephemeral identifier cache and inputting the ephemeral identifier and the rotation key into a reverse-obscuring function to obtain the time-modified identifier. For example, the reverse-obscuring function can be a block cipher (e.g. an Advanced Encryption Standard 128-bit block cipher).

Next, an exclusive-or operation can be performed with respect to the static identifier and the time-modified identifier to obtain the time-count used by the beacon device to generate the ephemeral identifier. As noted above, this time-count can be used to update the beacon clock correction factor.

In some embodiments, the beacon clock correction factor can be updated by a verifying entity based at least in part on a message integrity code received by an observing entity and relayed to the verifying entity and the device reception timestamp for the reception of the message integrity code by the observing entity.

As an example, updating the beacon clock correction factor can include identifying the expected time-count used to generate the expected message integrity code to which the received message integrity code was matched. The beacon clock correction factor can be updated based at least in part on a comparison of the expected time-count with the device reception timestamp.

As another example, in some embodiments, a beacon device can periodically transmit a burst or other rapid sequence of changing ephemeral identifiers or message integrity codes. Observations from the transmitted burst can be used for more precise calculation of the correction factor. Such a configuration can be useful, for example, in situations in which the ephemeral identifiers or message integrity code rotates infrequently (e.g. once per hour). The burst can be performed once per second, per minute, per day, or other time periods.

Referring to the FIGS., example embodiments of the present disclosure will now be discussed in further detail, one or more examples of which are illustrated in the drawings. Each example is provided by way of explanation of the present disclosure, not limitation of the present disclosure.

In fact, it will be apparent to those skilled in the art that various modifications and variations can be made to the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Example System

FIG. 1 depicts an example system 100 according to an example embodiment of the present disclosure. System 100 can include a plurality of beacon devices 102-110; one or more observing entities 112 and 114; and at least one verifying entity 118.

Beacon devices 102-110 can be used for many different applications, including, for example, co-presence (e.g. two entities becoming aware of each other), location-based gaming, asset tracking, beacon device localization or observing entity localization, telemetry, information provisioning (e.g. use of an observing entity to obtain various information such as semantic information or geographic information associated with beacon devices 102-110 as the observing entity moves about the world), intra-beacon communication, payment systems, security, etc. The present disclosure provides a general system that can be applicable to the above noted applications or other applications as well. More particularly, the present disclosure provides systems and methods that can generate and use ephemeral identifiers or message integrity codes within the context of any of the above applications.

Beacon devices 102-110 can be computing devices that are configured to emit messages or other signals. For example, the messages can be advertising frames that are broadcast by the beacon devices 102-110. The advertising frames can include ephemeral identifiers or static identifiers and message integrity codes generated according to the present disclosure. In some embodiments, the advertising frames can be used for the purpose of being "noticed" but not connected to. Thus, in such embodiments, the entirety of the interaction between the beacon devices 102-110 and the observing entities 112 and 114 can be performed without requiring a connection between the observing entity and the beacon device or a connection between the beacon device and the verifying entity 118. Instead, all relevant information for the interaction is contained within the advertising packets or frames emitted by the beacon device. Limiting beacon device interaction to the broadcasting of advertising frames can provide a nominal behavior that allows energy consumption and service life to be modeled and reasonably predicted.

In other embodiments, however, the beacon devices 102-110 can allow connections for configuration, provisioning, maintenance, firmware updates, or other functions. For example, in some embodiments, the beacon devices 102-110 can connect with the verifying entity 118 over a second communication channel. In yet further embodiments, the beacon devices 102-110 can be configured to provide additional information to an observing entity using a scan request (SCAN_REQ) and scan response (SCAN_RSP) interaction, which does not require actual connection between the devices. In some embodiments, the SCAN_RSP frames can also include a message integrity code.

As an example, the beacon devices 102-110 can broadcast the advertising frames using short range wireless communication technologies such as, for example, Bluetooth, Bluetooth low energy, ZigBee, Near Field Communication, WiFi Direct, or other technologies. Furthermore, although short range wireless communication technologies are provided as an example, any communication method can be used to transmit the advertising frames from the beacon devices 102-110 to the observing entities 112 and 114, including, for example, wired connections, general radio frequency communication, optical communication, infrared communication, magnetic communication, or other communication methods, including, for example, quantum communication methods.

Broadcasting of advertising frames can be the primary purpose of each beacon device 102-110 or can be a secondary purpose. Thus, in various embodiments of the present disclosure, each beacon device can be a computing device dedicated to periodic broadcasting of advertising frames; an embedded system within a larger computing device or system; a user computing device (e.g. a smartphone or wearable computing device) configured to perform broadcasting of advertising frames; other devices; or combinations thereof.

According to an aspect of the present disclosure, each of the beacon devices 102-110 can be provided with a beacon-specific static identifier at the time of provisioning. Example methods for assigning static identifiers will be discussed further below. Each beacon can also be provisioned with a beacon-specific secret key known as a rotation key. The static identifier and rotation key assigned to each beacon device 102-110 can also be known by the verifying entity 118 and can be used as a shared secret for ephemeral identifier or message integrity code generation and unobscuration and/or validation.

In some embodiments, each advertising event performed by a beacon device can consist of up to three advertising (ADV) frames being emitted by the beacon device. In embodiments in which beacon devices employ Bluetooth low energy (BLE) technology for broadcasting, each ADV frame can carry a maximum 31-byte payload and can be sent on one of three designated advertising channels within the 40-channel BLE radio spectrum. As noted, advertisements can be broadcast events that are capable of being received and processed by any listening device (e.g. observing entity). Further, the above example implementation using BLE technology is provided as an example only. Other suitable communication protocols having different frame formats or channel assignments can be used, as well. In addition, as certain protocols are modified or replaced over time, the present disclosure can be easily adapted for implementation using such new protocols.

In some embodiments, each ADV frame can indicate in the frame format whether the broadcasting beacon device is Connectable, Scannable, or Non-Connectable/Non-Scannable. For frames which are Connectable or Scannable, a listening device can send a request for an additional 31-byte frame to be sent which may contain additional information from the beacon device.

In some embodiments, the request (SCAN_REQ) can contain no data, only a "return address" to which the beacon device can direct its response (SCAN_RSP).

However, in other embodiments, the SCAN_REQ can include observing entity-specific data that can be used by the beacon device to generate a message integrity code to be included in the SCAN_RSP, whereby observer-specific information can be used to generate message integrity codes that provide improved defense against replay attacks.

More particularly, as ADV frames are typically broadcasted, they may be susceptible to replay impersonation within a period of time for which the message integrity code included in the ADV frame is valid (e.g. within one rotation period). Therefore, in some embodiments of the present disclosure, alternatively or in addition to a message integrity code included in the ADV frame, a message integrity code can be included in a SCAN_RSP frame or some other response frame that is directed to a specific observing entity. In particular, for example, the message integrity code included in the response frame can be generated based on observer-specific information sent directly to the beacon device from the observing entity. Likewise, the response frame can be sent directly from the beacon device to the requesting observing entity, thereby reducing the risk of impersonation or other spoofing attacks.

In some embodiments, the total message, which includes the ADV frame and the SCAN_RSP frame featuring message integrity code, can be treated as a package. In particular, the response frames can typically include information that is also time-varying, or that is itself obscured according to the obscuration algorithms discussed herein. As a result, the total message is a unique message that can be tied to a specific interaction between a specific combination of observing entity and beacon device.

Furthermore, in contrast to usage of the beacon identifier for generating ADV frame message integrity codes, in some embodiments, the message integrity code that is included in the response frame can be calculated over the entire payload or a subset of the payload of the response frame.

In addition, while response frames including message integrity codes have been discussed above within the context of a system using Bluetooth low energy communication techniques, the concepts discussed therein can easily be applied to other communication protocols and technologies that allow for requests and responses between observing entities and beacon devices.

In some embodiments of the present disclosure, each advertising frame can employ 30 of the maximum 31-byte payload. As an example, bytes 1-3 may be used for BLE flags; bytes 4-7 may be used for service data headers; byte 8 may be used to indicate a frame type; byte 9 may be used for flags and a radio channel on which the ADV frame is emitted; byte 10 may indicate a calibrated or estimated transmission power for the ADV frame; bytes 11-26 may be used to communicate a beacon identifier such as the static identifier or an ephemeral beacon identifier; and bytes 27-30 may be used to communicate the message integrity code. In other embodiments, other frame formats or designations can be used. In particular, the bit-size of the message integrity code and its placement in the above described frame is simply one potential configuration provided as an example.

As another example, each SCAN_RSP frame can include four bytes of manufacturer specific data header; 1-27 bytes of manufacturer specific payload data; and four bytes of message integrity code. For example, in some embodiments, the payload data of a SCAN_RSP frame can be used for telemetry or to provide other data.

Further, the above example implementations using BLE technology are provided as examples only.

In some embodiments, the static identifier assigned to each beacon device 102-110 can be a 16-byte time constant identifier. As an example, the static identifier can be the concatenation of a 10-byte namespace identifier and a 6-byte beacon instance identifier. However, other formats or bit-sizes can be used, as well.

As an example, the namespace identifier can be a class of beacons associated with a particular application or organization. Thus, in some embodiments, the namespace identifier can be used to select observed ADV frames for routing to a particular application that may be capable of further identifying the beacon instance identifier. Likewise, namespaces can provide a means for organization which deploy beacon devices to segment populations of beacon devices according to particular applications, use cases, or categorizations.

In some embodiments, each namespace identifier can be based in whole or in part on a Universally Unique Identifier (UUID). For example, the namespace identifier can be the four most significant bytes and the six least significant bytes of a 128-bit UUID determined according to Internet Engineering Task Force RFC: 4122.

The beacon instance identifier can identify a specific beacon device within a namespace. Each beacon instance identifier can be unique within a given namespace.

Observing entities 112 and 114 can be computing devices configured to receive advertising frames from each of beacon devices 102-110. As example, observing entities 112 and 114 can be user computing devices such as a smartphone, a laptop, a desktop, or a wearable computing device; and embedded system on a machine; other devices; or combinations thereof. In some embodiments, a single device may have components for performing beacon device functionality and components for performing observing entity functionality.

In some embodiments, each of observing entities 112 and 114 can have plural processors or processing modules. For example, each observing entity can include a system on a chip (SoC) that performs low-power background scans for advertising frames, provides a means for batching observed advertising frames, and performs periodic bulk-transfers to improve energy efficiency. Each of observing entities 112 and 114 can further include an application level processor with the capability to provide adaptive scanning collaboratively with the SoC. The application level processor can perform other high level tasks as well. Likewise, beacon devices 102-110 can also have plural processors or processing modules as discussed above.

Verifying entity 118 can be one or more computing devices configured to communicate with observing entities 112 and 114 over a network 116. As an example, verifying entity 118 can be one or more server computing devices. In the instance that a plurality of server computing devices are used, the server computing devices can be arranged according to any suitable computing architecture, including sequential computing architectures, parallel computing architectures, or combinations thereof.

Network 116 can be any type of communications network, such as a local area network (e.g., intranet), wide area network (e.g., Internet), or some combination thereof and can include any number of wired or wireless links. In general, communication between the verifying entity 118 and observing entities 112 and 114 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Furthermore, although each observing entity 112 and 114 is shown as communicating directly with the verifying entity 118 over network 116, there may be any number of intervening devices between the observing entity 112 or 114 and the verifying entity 118. As an example, in some embodiments, groups of observing entities can be organized in a network (e.g. a mesh network) and can relay messages back and forth from a particular observing entity to the verifying entity 118.

According to an aspect of the present disclosure, each beacon device 110-112 can be configured to periodically determine an ephemeral identifier or a message integrity code to broadcast within the advertising frames. More particularly, static identifiers can be used in fully public and open situations where having any scanning client observe and understand the static identifiers is desirable. Further, in some embodiments, beacon devices may additionally transmit a Message Authentication Code (MAC) along with the static identifier to allow authentication of the static identifier and further protect against namespace collisions.

However, in many instances, it may be undesirable for the static identity and presence of a beacon device to be fully transparent and publicly available. Therefore, according to an aspect of the present disclosure, ephemeral identifiers or message integrity codes can be used to provide a means to respectively obscure or authenticate the identity of the beacon device by changing at predetermined intervals the ephemeral identifiers or message integrity codes transmitted by the beacon devices. In particular, because the generation of the ephemeral identifiers or message integrity codes relies upon one or more shared secrets and a current time of the beacon device, unobscuration or validation of the respective ephemeral identifiers or message integrity codes requires knowledge of the one or more shared secrets and a shared concept of time. With these items of information, ephemeral identifiers and/or message integrity codes can be effectively used in situations in where it may be undesirable or dangerous to advertise a static identifier or authentication of the identity of a beacon device is desirable.

Further, because the observing entities 112 and 114 typically do not have the shared secrets or shared concept of time, the ephemeral identifiers or message integrity codes are not able to be directly usable or validated, respectively, and require additional processing steps to make them usable for observing entities 112 and 114 to receive authentication of the beacon device. Therefore, ephemeral identifiers or message integrity codes can be used to provide privacy, security, and access control mechanisms.

Example Ephemeral Identifier Generation

Figure 2A:
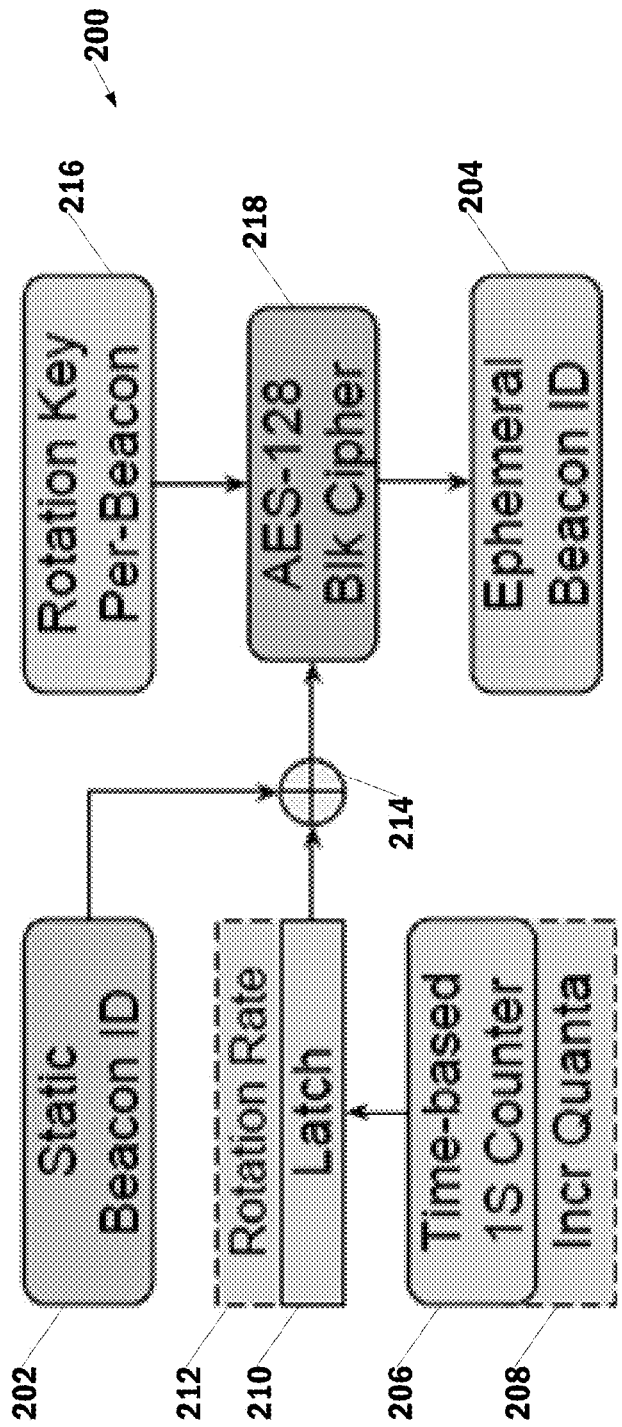
FIG. 2A depicts an example functional diagram for generating ephemeral identifiers on a beacon device according to an example embodiment of the present disclosure.

FIG. 2A depicts an example functional diagram 200 for generating ephemeral identifiers on a beacon device according to an example embodiment of the present disclosure. In particular, functional diagram 200 depicts a process for generating an ephemeral identifier 204 from a static identifier 202.

A time-based counter 206 can be used to increment a time-count over time (e.g. can increment the time-count once per second as shown in FIG. 2A or other designated interval of incrementation). The interval at which the time-based counter 206 increments the time-count can be a shared secret between the beacon device and the verifying entity, so that the verifying entity is able to predict with reasonable accuracy the current time-count at the beacon device at a given time, while devices that do not have knowledge of the interval of incrementation may be unable to do so.

The time-based counter 206 can increment the time-count by a predetermined increment quanta 208 per instance of incrementation. The increment quanta 208 can be a number that is equal to one or not equal to one. The increment quanta 208 can be a shared secret between the beacon device and the verifying entity, so that the verifying entity is able to predict with reasonable accuracy the current time-count at a beacon device at a given time, while devices that do not have knowledge of the increment quanta 208 may be unable to do so. Likewise, use of an increment quanta 208 that is not equal to one may increase the entropy of the resulting ephemeral identifiers 204.

The beacon device can also use a rotation rate 212 to define how often the beacon device should generate a new ephemeral identifier. By extension, the rotation rate 212 can also be used to define a period of time for which a given ephemeral identifier represents a valid identification for the broadcasting beacon device.

As such, when a new ephemeral identifier is to be generated according to the current time and rotation rate 212, the current time-count of the time-based counter 206 can be read or otherwise obtained. For example, a latch tool 210 can be used to capture the particular time-count of the counter 206 at a given time. The rotation rate 212 can also be a shared secret between the beacon device and the verifying entity, so that the verifying entity is able to predict with reasonable accuracy when and how often the beacon device will be generating a new ephemeral identifier, while devices that do not have knowledge of the rotation rate may be unable to do so.

The various shared secret variables described above can be used to provide the beacon device and the verifying entity with a shared sense of one second or other resolution of time within a unique time incrementing scheme that features a random starting point established at the time of provisioning.

Once the current time-count has been obtained, it can be used along with the static identifier 202 to generate a time-modified identifier. In particular, as shown in FIG. 2A, the time-modified identifier can be obtained by performing at 214 an exclusive-or operation with respect to the current time-count and the static identifier 202. Thus, in such embodiments, the current time-count can be represented by data having the same bit-size as the static identifier 202.

The time-modified identifier can then be used along with a rotation key 216 to generate the ephemeral identifier 204. As an example, as shown in FIG. 2A, the time-modified identifier and the rotation key 216 can be input into an Advanced Encryption Standard 128-bit block cipher 218 or other obscuring function.

The rotation key 216 can be specific to each beacon device and can be a shared secret between each beacon device and the verifying entity. As such, given an ephemeral identifier 204, only the beacon device and the verifying entity that have knowledge of the particular beacon device's rotation key 216 will be able to unobscure the ephemeral identifier 204 to obtain the time-modified identifier. Further, because the rotation key 216 is specific to each beacon device, if one of the plurality of beacon devices become compromised or their information otherwise becomes publicly available, a malicious entity will be unable to fraudulently generate ephemeral identifiers representing any of the other non-compromised beacon devices.

In such fashion, a beacon device can periodically generate a new ephemeral identifier 204 to include in its broadcasts. Further, because the verifying entity also has knowledge of the shared secrets and can predict the beacon time-based counter with reasonable accuracy, the verifying entity can independently generate and store ephemeral identifiers that will be used by each beacon device at any given point in time.

Furthermore, combining the current time-count with the static identifier 202 can ensure that resulting ephemeral identifier 204 will not be stable for each subsequent ephemeral identifier generation. In addition, combining the time-count with the static identifier 202 allows time to be extracted by the verifying entity as part of the ephemeral identifier reversal and validation process, thereby allowing the verifying entity to both assure that the ephemeral identifier is arriving within an agreed-upon window of time and also update or maintain the shared sense of time by receiving an indication of the time-count used by the beacon device to generate the ephemeral identifier 204.

Example Ephemeral Identifier Processing

Figure 3A:
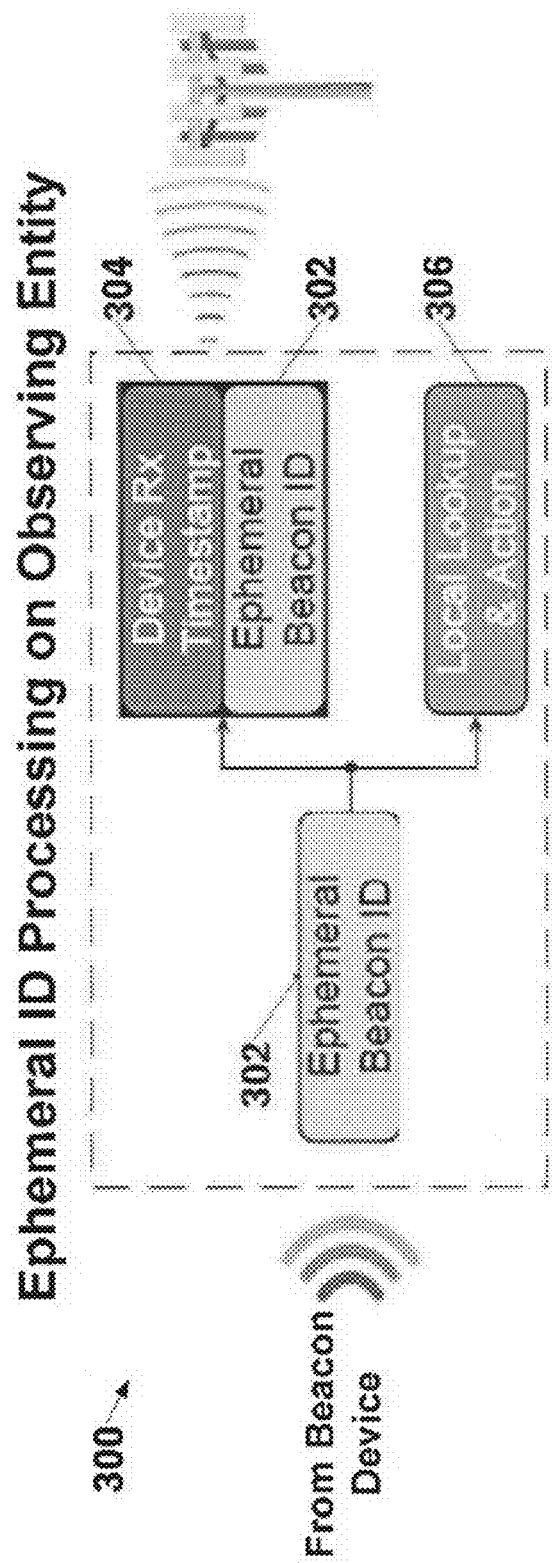
FIG. 3A depicts an example functional diagram for processing ephemeral identifiers on an observing entity according to an example embodiment of the present disclosure.

FIG. 3A depicts an example functional diagram 300 for processing ephemeral identifiers on an observing entity according to an example embodiment of the present disclosure. The observing entity can receive an ephemeral identifier 302 from a beacon device.

In response to receiving the ephemeral identifier 302 from the beacon device, the observing entity can transmit the received ephemeral identifier 302 to a verifying entity in order for the ephemeral identifier 302 to be validated and comprehended. In addition, the observing entity can transmit a device reception timestamp 304 along with the ephemeral identifier 302. The device reception timestamp can indicate a time at which the observing entity received the ephemeral identifier from the beacon device.

Alternatively or additionally, the observing entity can locally perform some aspects of the verifying entity functionality or can have pre-received data from the verifying entity that allows the observing entity to identify the beacon device or at least to determine an appropriate response to receiving the beacon device broadcast absent precise identification of the beacon device. Thus, in such embodiments, the observing entity can perform a local lookup and action 306.

As an example, in some embodiments, the verifying entity can pre-load data onto the observing entity that allows the observing entity to perform the local lookup and action 306. For example, in some embodiments, the pre-loaded data can include hashed filter shards placed into a probabilistic filter (e.g. a Bloom filter) present on the observing entity. The observing entity can then query the probabilistic filter using a locally hashed version of the ephemeral identifier 302 to receive an indication (with some risk of false positives) of whether filter shards corresponding to the particular received ephemeral identifier 302 are present within the filter dataset.

In such fashion, the observing entity may be able to identify a class or subset to which the beacon device from which ephemeral identifier 302 was received belongs. Therefore, the observing entity may be able to identify certain desired operations in response to receiving the ephemeral identifier 302 without ever obtaining the precise identity of the beacon device from which the ephemeral identifier 302 was received.

In further embodiments, the observing entity can have the filter data organized into a plurality of hierarchical probabilistic filters to provide enhanced categorization, identification, and processing efficiency.

Example Ephemeral Identifier Generation

Figure 4A:
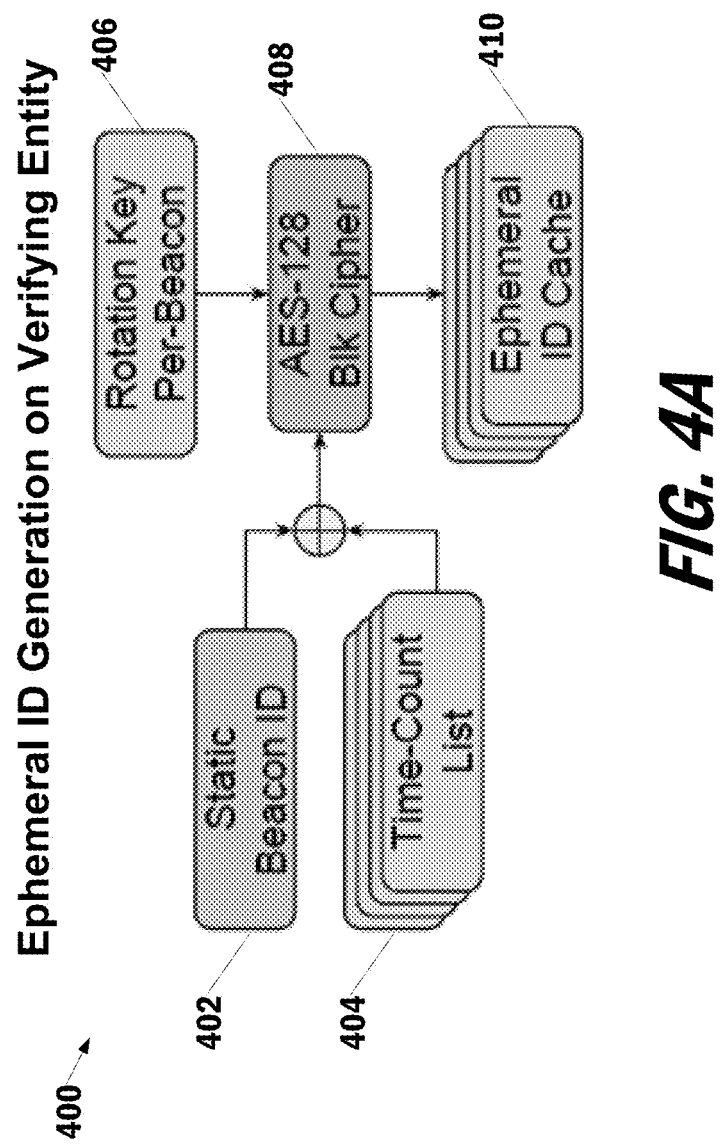
FIG. 4A depicts an example functional diagram for generating ephemeral identifiers on a verifying entity according to an example embodiment of the present disclosure.

FIG. 4A depicts an example functional diagram 400 for generating ephemeral identifiers on a verifying entity according to an example embodiment of the present disclosure. In particular, the process depicted in functional diagram 400 can leverage knowledge of the shared secrets used by the beacon device to pre-compute ephemeral identifiers that are expected to be used by a given beacon device at a certain time. As such, using the process depicted in diagram 400, the verifying entity can generate an ephemeral identifier cache 410 that contains a large number of ephemeral identifiers that will be used by the beacon devices over a significant period of time.

More particularly, for each beacon device for which corresponding ephemeral identifiers are desired to be included in the ephemeral identifier cache 410, the verifying entity can first combine the static identifier 402 associated with such beacon device with each of a plurality of time-counts included in a time-count list 404. The time-count list 404 can include a time-count for each ephemeral identifier desired to be included in the cache 410. More particularly, each time-count can be a projected time-count of the time-based counter included in the corresponding beacon device at the time at which the ephemeral identifier is projected to be created in view of the known time keeping parameters.

As an example, as shown in FIG. 4A, the plurality of time-counts included in time-count list 404 can be respectively combined with the static identifier 402 by respectively performing an exclusive-or operation to obtain a plurality of time-modified identifiers.

Next, as shown in FIG. 4A, the plurality of time-modified identifiers can be respectively inputted into an Advanced Encryption Standard 128-bit block cipher 408 along with a rotation key 406 to obtain the plurality of ephemeral identifiers to be included in the ephemeral identifier cache 410. Other obscuring functions can be used alternatively or in addition to the block cipher 408. The static identifier 402 and rotation key 406 will be specific and different for each beacon device for which the cache 410 is desired to contain corresponding ephemeral identifiers. Furthermore, by modifying the time-counts included in time-count list 404, the periods of time to which ephemeral identifiers for a given beacon device are desired to correspond can be controlled.

In some embodiments, the cache 410 can further store or reference the particular static identifier 402 and rotation key 406 used to generate each ephemeral identifier included in the cache 410. In such fashion, by locating a later-received ephemeral identifier within the cache 410, the verifying entity will be able to obtain the static identifier 402 and rotation key 406 for the particular beacon device that transmitted such ephemeral identifier.

Example Ephemeral Identifier Processing

Figure 5:
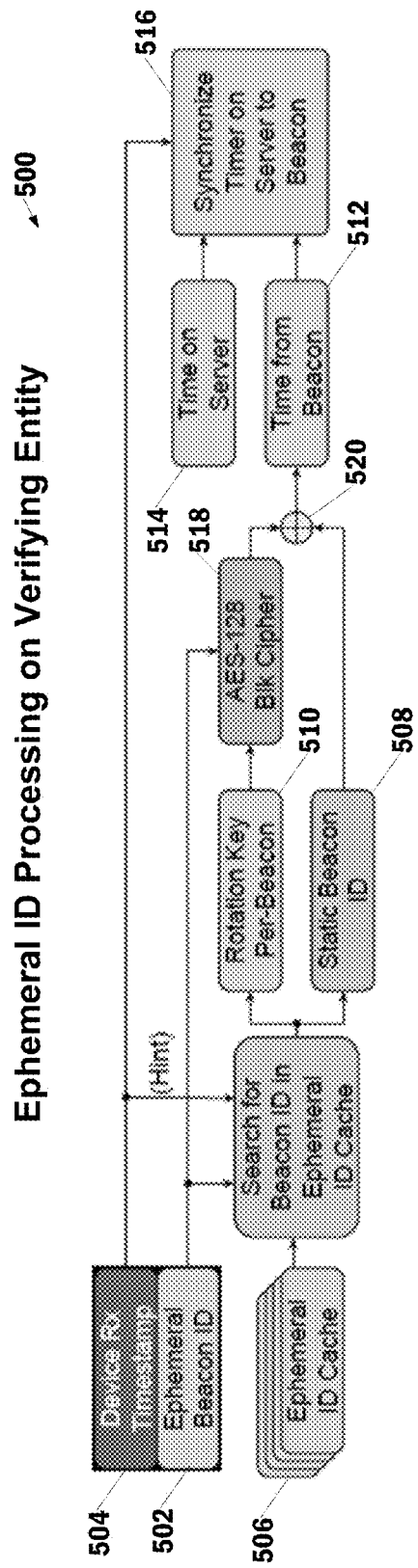
FIG. 5 depicts an example functional diagram for processing ephemeral identifiers on a verifying entity according to an example embodiment of the present disclosure.

FIG. 5 depicts an example functional diagram 500 for processing ephemeral identifiers on a verifying entity according to an example embodiment of the present disclosure. The verifying entity can receive an ephemeral identifier 502 and a device reception timestamp 504 from an observing entity. The verifying entity can locate the received ephemeral identifier 502 within an ephemeral identifier cache 506 to obtain the static identifier 508 and rotation key 510 associated with the beacon device that broadcasted the particular ephemeral identifier 502.

More particularly, as discussed above with respect to FIG. 4A, the verifying entity can pre-compute expected ephemeral identifiers that will be used by a given beacon device. As such, the verifying entity can generate an ephemeral identifier cache 506 that contains a large number of ephemeral identifiers that will be used by the beacon devices over a significant period of time.

In some embodiments, for each entry of an ephemeral identifier stored in the ephemeral identifier cache 506, the static identifier 508 and the rotation key 510 for the corresponding beacon device can also be stored in or referenced by the entry in the ephemeral identifier cache 506. Thus, by locating the received ephemeral identifier 502 in the cache 506, the verifying entity can obtain the static identifier 508 for the corresponding beacon device.

In addition, in some embodiments, the device reception timestamp 504 can be used as a hint to locate the ephemeral identifier 502 within the cache 506 more quickly. For example, the ephemeral identifiers can be organized within the ephemeral identifier cache 506 according to their corresponding times of validity. Therefore, the cache 506 can be searched around the time provided by the device reception timestamp 504 to more quickly locate the ephemeral identifier 502 within the cache 506.

Having identified the beacon device from which the observing entity received the ephemeral identifier, the verifying entity can provide information associated with the identified beacon device to the observing entity. For example, the information provided can include the identity of the beacon device, the precise location of the beacon device, semantic information associated with the beacon device (e.g. a name or other textual information or graphical information associated with the beacon device), or other information. Alternatively or in addition to providing the observing entity with information, the verifying entity can perform one or more operations in response to identifying the beacon device, including, as examples, adding the observing entity to a particular grouping of entities, modifying locally stored data, or adjusting a counter associated with analytics.

In further embodiments of the present disclosure, the verifying entity can perform one or more security checks prior to or after identifying the beacon device. As an example, the verifying entity can match the observing entity versus an access control list associated with the identified beacon device or the received ephemeral identifier 502. For example, use of an access control list can allow the operator of the beacon device to control which observing entities are entitled to be provided by the verifying entity with the information associated with the beacon device (e.g. the identity of the beacon device).

Furthermore, because the ephemeral identifiers used by a beacon device will change over time, the access control list may also specify when and for how long certain observing entities are entitled to receive the information associated with the beacon device. In such fashion, verifying entities can be capable of empowering specified observing entities to recognize ephemeral identifiers for a defined time interval without compromising privacy before or after this interval.

Furthermore, the verifying entity can unobscure the ephemeral identifier 502 to obtain a time-count 512 used by the beacon device to generate the ephemeral identifier 502. The verifying entity can then determine a time difference between the time-count 512 used by the beacon device to generate the ephemeral identifier and the device reception timestamp 504 also received from the observing entity. If the time difference exceeds a threshold value (e.g. the rotation rate), then the observing entity may be denied the information associated with the beacon device.

As yet another example, if a time difference between the current time and the device reception timestamp 504 exceeds a threshold value, then the observing entity's reception of the ephemeral identifier 502 may be designated as stale and the verifying entity may deny access to the information associated with the beacon device.

The verifying entity can perform operations to address beacon device clock drift. As an example, in some embodiments, the verifying entity can maintain a beacon clock correction factor for each of the beacon devices. The beacon clock correction factor for each beacon device can describe an offset between the clock of the verifying entity 514 and the clock of such beacon device. The beacon clock correction factor can be a single value or can be a complex function that provides a time-varying relationship (e.g. includes a scaling factor).

In some embodiments, the beacon clock correction factor can be updated by a verifying entity (illustrated in FIG. 5 by synchronization box 516) based at least in part on the ephemeral identifier 502 and the device reception timestamp 504. As an example, updating 516 the beacon clock correction factor can include unobscuring the ephemeral identifier 502 to obtain the time-count 512 used by the beacon device to generate the ephemeral identifier 502. The beacon clock correction factor can be updated based at least in part on a comparison of the unobscured time-count 512 with the device reception timestamp 504.

More particularly, unobscuring the ephemeral identifier 502 can include obtaining the static identifier 508 and rotation key 510 associated with the beacon device from the ephemeral identifier cache 506 and inputting the ephemeral identifier 502 and the rotation key 510 into an Advanced Encryption Standard 128-bit block cipher 518 to obtain the time-modified identifier. Other obscuring functions can be used alternatively or in addition to the block cipher 518, as well. Next, an exclusive-or operation 520 can be performed with respect to the static identifier 508 and the time-modified identifier to obtain the time-count 512 used by the beacon device to generate the ephemeral identifier. As noted above, this time-count 512 can be used to update 516 the beacon clock correction factor.

In such fashion, shared secrets between the beacon devices and the verifying entity can be leveraged to provide access to information associated with a given beacon device to authorized observing entities. Furthermore, the received ephemeral identifiers can be unobscured and used to maintain or update the shared sense of time between the verifying entity and the beacon devices.

Example Message Integrity Code Generation

Figure 2B:
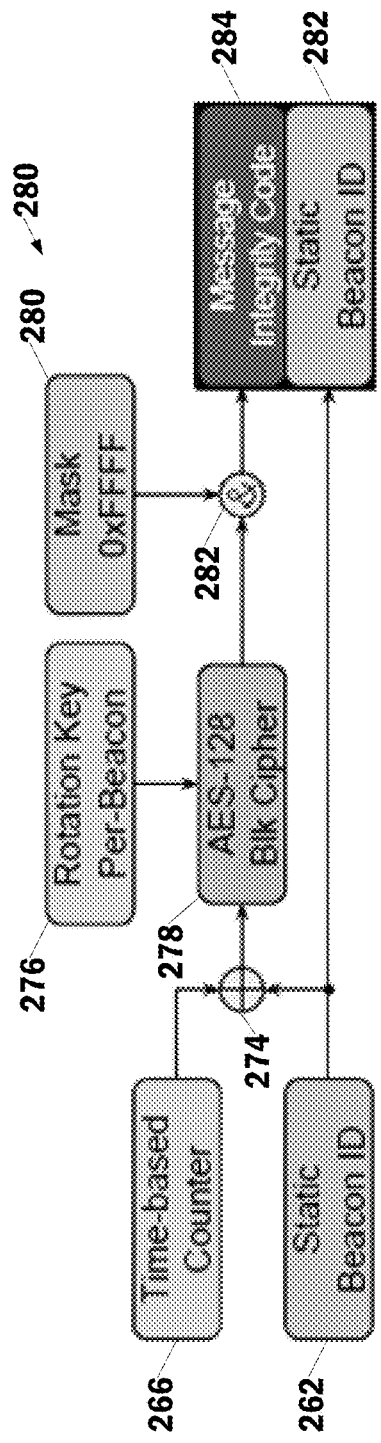
FIG. 2B depicts an example functional diagram for generating message integrity codes on a beacon device according to an example embodiment of the present disclosure.

FIG. 2B depicts an example functional diagram 260 for generating message integrity codes on a beacon device according to an example embodiment of the present disclosure. In particular, functional diagram 260 depicts a process for generating a message integrity code 264 from a static identifier 262.

A time-based counter 266 can be used to increment a time-count over time (e.g. can increment the time-count once per second or other designated interval of incrementation). The interval at which the time-based counter 266 increments the time-count can be a shared secret between the beacon device and the verifying entity, so that the verifying entity is able to predict with reasonable accuracy the current time-count at the beacon device at a given time, while devices that do not have knowledge of the interval of incrementation may be unable to do so.

The time-based counter 266 can increment the time-count by a predetermined increment quanta per instance of incrementation. The increment quanta can be a number that is equal to one or not equal to one. The increment quanta can be a shared secret between the beacon device and the verifying entity, so that the verifying entity is able to predict with reasonable accuracy the current time-count at a beacon device at a given time, while devices that do not have knowledge of the increment quanta may be unable to do so. Likewise, use of an increment quanta that is not equal to one may increase the entropy of the resulting message integrity codes 264.

The beacon device can also use a rotation rate to define how often the beacon device should generate a new message integrity code. By extension, the rotation rate can also be used to define a period of time for which a given message integrity code represents a valid integrity code for the broadcasting beacon device.

As such, when a new message integrity code is to be generated according to the current time and rotation rate, the current time-count of the time-based counter 266 can be read or otherwise obtained. For example, a latch tool can be used to capture the particular time-count of the counter 266 at a given time. The rotation rate can also be a shared secret between the beacon device and the verifying entity, so that the verifying entity is able to predict with reasonable accuracy when and how often the beacon device will be generating a new message integrity code, while devices that do not have knowledge of the rotation rate may be unable to do so.

The various shared secret variables described above can be used to provide the beacon device and the verifying entity with a shared sense of one second or other resolution of time within a unique time incrementing scheme that features a random starting point established at the time of provisioning.

Once the current time-count has been obtained, it can be used along with the static identifier 202 to generate a time-modified identifier. In particular, as shown in FIG. 2B, the time-modified identifier can be obtained by performing at 274 an exclusive-or operation with respect to the current time-count and the static identifier 262. Thus, in such embodiments, the current time-count can be represented by data having the same bit-size as the static identifier 262.

The time-modified identifier can then be used along with a rotation key 276 to generate a message integrity code precursor. As an example, as shown in FIG. 2B, the time-modified identifier and the rotation key 276 can be input into an Advanced Encryption Standard 128-bit block cipher 278.

The rotation key 276 can be specific to each beacon device and can be a shared secret between each beacon device and the verifying entity. As such, given a message integrity code 264, only the beacon device and the verifying entity that have knowledge of the particular beacon device's rotation key 276 will be able to validate the message integrity code 264. Further, because the rotation key 276 is specific to each beacon device, if one of the plurality of beacon devices become compromised or their information otherwise becomes publicly available, the ability to authenticate other beacons is not compromised.

The message integrity code precursor can then be combined with a mask 270 by performing an AND operation (shown at 272) to obtain the message integrity code 264. In some embodiments, the mask 270 can be used to select a subset or a portion of the message integrity code precursor to use as the message integrity code 264. For example, in some embodiments, the message integrity code precursor can be a 16-byte value and the mask 270 can be used to select 4-bytes worth of data from the message integrity code precursor to use as the message integrity code 264. Similar to the rotation key 276, in some embodiments, the mask 270 can be a shared secret between each beacon device and the verifying entity.

In such fashion, a beacon device can periodically generate a new message integrity code 264 to include in its broadcasts along with the static identifier 262. Further, because the verifying entity also has knowledge of the shared secrets and can predict the beacon time-based counter 266 with reasonable accuracy, the verifying entity can independently generate message integrity codes that are expected to be used by each beacon device at any given point in time.

Furthermore, combining the current time-count with the static identifier 202 can ensure that resulting message integrity code 264 will not be stable for each subsequent message integrity code generation. In addition, combining the time-count with the static identifier 262 allows time to be extracted by the verifying entity as part of the message integrity code reversal and validation process, thereby allowing the verifying entity to both assure that the message integrity code is arriving within an agreed-upon window of time and also update or maintain the shared sense of time by receiving an indication of the time-count used by the beacon device to generate the message integrity code 264.

Example Message Integrity Code Processing

Figure 3B:
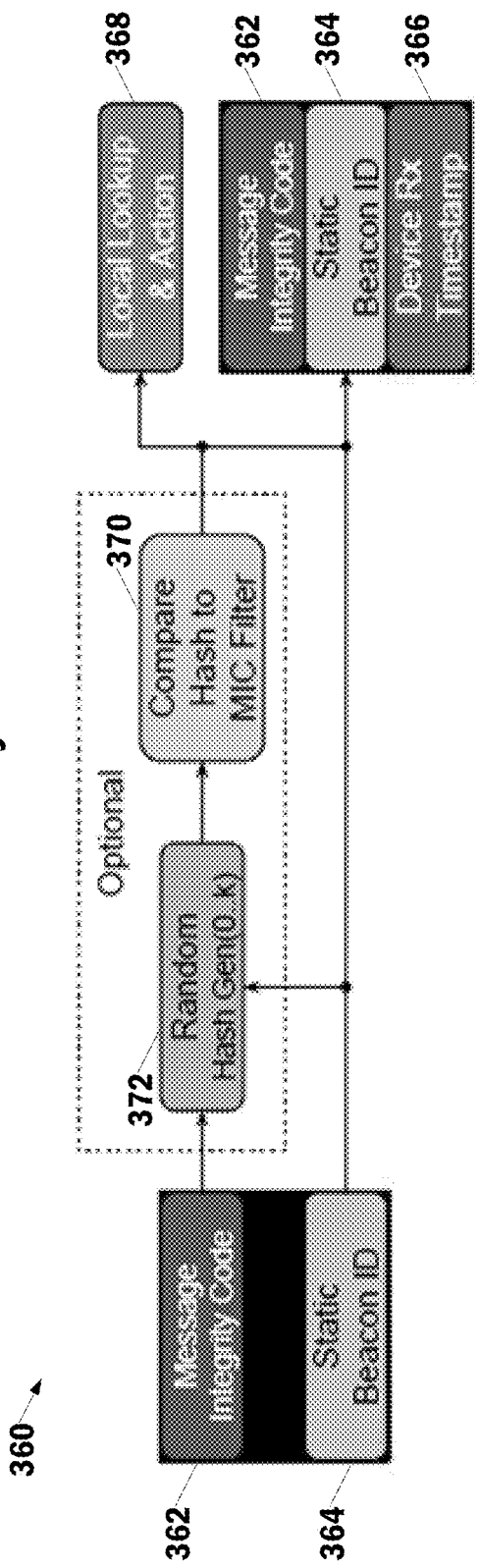
FIG. 3B depicts an example functional diagram for processing message integrity codes on an observing entity according to an example embodiment of the present disclosure.

FIG. 3B depicts an example functional diagram 360 for processing message integrity codes on an observing entity according to an example embodiment of the present disclosure. The observing entity can receive a message integrity code 362 and a static identifier 364 from a beacon device.

In response to receiving the static identifier 364 and the message integrity code 362 from the beacon device, the observing entity can transmit the received static identifier 364 and message integrity code 362 to a verifying entity in order for the message integrity code 362 to be validated and, therefore, the use of static identifier 364 to be authenticated. In addition, the observing entity can transmit a device reception timestamp 366 along with the message integrity code 362. The device reception timestamp 366 can indicate a time at which the observing entity received the message integrity code 362 from the beacon device.

Alternatively or additionally, the observing entity can locally perform some aspects of the verifying entity functionality or can have pre-received data from the verifying entity that allows the observing entity to identify the beacon device or at least to determine an appropriate response to receiving the beacon device broadcast absent contemporaneous authentication of the message integrity code by the verifying entity. Thus, in such embodiments, the observing entity can perform a local lookup and action 368.

As an example, in some embodiments, the verifying entity can pre-load data onto the observing entity that allows the observing entity to perform the local lookup and action 308. For example, in some embodiments, the pre-loaded data can include hashed filter shards placed into a probabilistic filter (e.g. a Bloom filter) present on the observing entity. The observing entity can then query (shown at 370) the probabilistic filter using a locally hashed version (shown at 372) of the message integrity code 372 to receive an indication (with some risk of false positives) of whether filter shards corresponding to the particular received message integrity code 362 are present within the filter dataset.

In such fashion, the observing entity may be able to identify a class or subset to which the beacon device from which message integrity code 362 was received belongs. Therefore, the observing entity may be able to identify certain desired operations in response to receiving the message integrity code 362 without ever obtaining the contemporaneous authentication of the static identifier 364.

In further embodiments, the observing entity can have the filter data organized into a plurality of hierarchical probabilistic filters to provide enhanced categorization, identification, and processing efficiency.

Figure 4B:
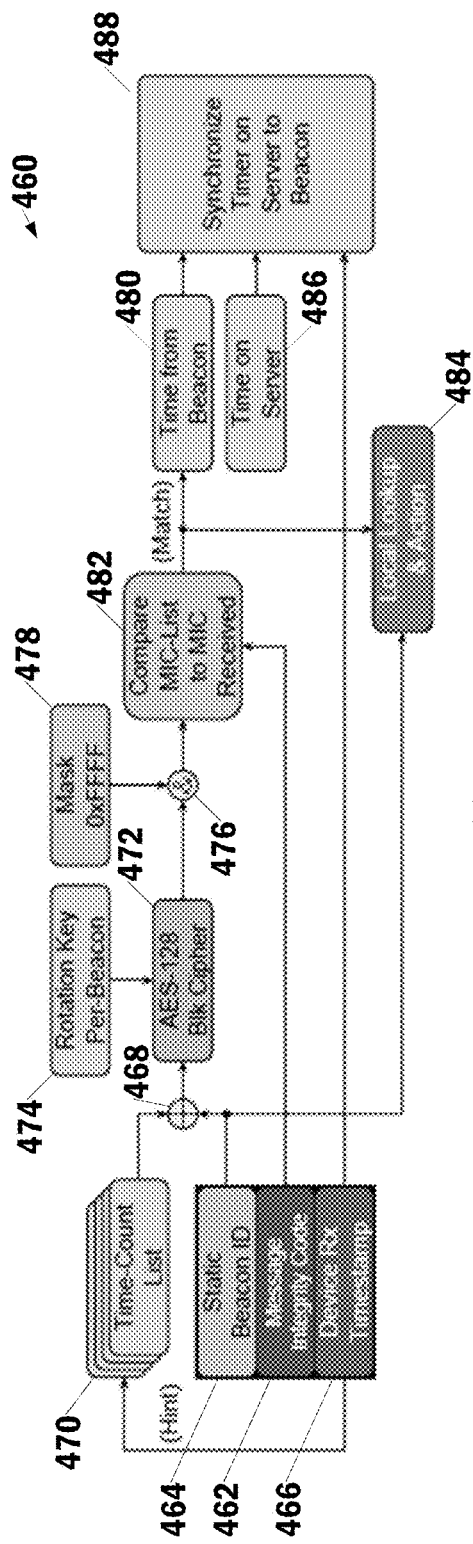
FIG. 4B depicts an example functional diagram for processing message integrity codes on a verifying entity according to an example embodiment of the present disclosure.

FIG. 4B depicts an example functional diagram 460 for processing message integrity codes on a verifying entity according to an example embodiment of the present disclosure. The verifying entity can receive a message integrity code 462, a static identifier 464, and a device reception timestamp 466 from an observing entity.

According to an aspect of the present disclosure, in some embodiments, when the verifying entity receives a message integrity code 462 from an observing entity, the verifying entity can determine the validity of the message integrity code 462 and, therefore, authenticate the static identifier 464 broadcasted by the beacon device along with the message integrity code 462.

As an example, when the verifying entity receives the static identifier 464 and message integrity code 462, the verifying entity can use a similar obscuration scheme and knowledge of the shared secrets to generate a plurality of expected message integrity codes that are expected to be used by the beacon device associated with the received static identifier. The received message integrity code can then be matched against the expected message integrity codes. If a match is found, then the verifying entity can authenticate the beacon device's use of the static identifier to the observing entity.

In particular, in some embodiments, the plurality of expected message integrity codes can be generated by, first, generating a plurality of expected time-modified identifiers by respectively performing an exclusive-or operation 468 with respect to the static identifier 464 and a plurality of expected time-counts included in a time-count list 470.

As an example, the plurality of expected time-counts included in the time-count list 470 can be generated based at least in part on the device reception timestamp 466. For example, the verifying entity can use its shared knowledge of the particular time-keeping scheme of the beacon device associated with the static identifier 464 to determine the beacon counter time-counts that such beacon will use to generate its message integrity codes within a window of time around the time indicated by the device reception timestamp 466.

The plurality of expected time-modified identifiers can then be respectively input into an Advanced Encryption Standard 128-bit block cipher 472 along with a rotation key 474 associated with the static identifier 464 to generate a plurality of expected message integrity code precursors. The rotation key 474 can be a shared secret specific to the beacon device associated with the static identifier 464.

An AND operation 476 can then be respectively performed with respect to a mask 478 and the plurality of expected message integrity code precursors to generate a list of expected message integrity codes. In some embodiments, the mask 478 can be a shared secret specific to the beacon device.

In some embodiments, for each expected message integrity code generated by the verifying entity, the expected time-count used to generate such expected message integrity code can also be stored alongside and/or referenced by the corresponding expected message integrity code. Thus, by matching the received message integrity code with a generated expected message integrity code, the verifying entity can also obtain the expected time-count used to generate the expected message integrity code. Such expected time-count should be equivalent to the time-count used by the beacon device to generate the broadcasted message integrity code, thereby providing an indication of a current status of the beacon device's internal clock, as will be discussed further below.

The verifying entity can validate the received message integrity code 472 by matching (shown at 482) the message integrity code 462 to one of the expected message integrity codes in the generated list. In response to validating the message integrity code 462, the verifying entity can perform various operations (shown at 484) and/or obtain additional information.

As an example, the verifying entity can authenticate the beacon device's use of the static identifier 464 to the observing device and, in some embodiments, can provide further information associated with the authenticated beacon device to the observing entity. For example, the information provided can include the precise location of the beacon device, semantic information associated with the beacon device (e.g. a name or other textual information or graphical information associated with the beacon device), or other information. Alternatively or in addition to providing the observing entity with information, the verifying entity can perform one or more operations in response to authenticating the use of the static identifier, including, as examples, adding the observing entity to a particular grouping of entities, modifying locally stored data, or adjusting a counter associated with analytics.

In further embodiments of the present disclosure, the verifying entity can perform one or more security checks prior to or after authenticating the beacon device. As an example, the verifying entity can match the observing entity versus an access control list associated with the authenticated beacon device or the received message integrity code. For example, use of an access control list can allow the operator of the beacon device to control which observing entities are entitled to be provided by the verifying entity with an authentication of the beacon device or the additional information associated with the beacon device.

Furthermore, because the message integrity codes used by a beacon device will change over time, the access control list may also specify when and for how long certain observing entities are entitled to receive the authentication and/or the information associated with the beacon device. In such fashion, verifying entities can be capable of empowering specified observing entities to receive authentication of message integrity codes for a defined time interval without compromising privacy before or after this interval.

As another example, in some embodiments, the verifying entity can identify the expected time-count that was used to generate the expected message integrity code to which the received message integrity code 462 was matched. The verifying entity can then determine a time difference between the expected time-count and the device reception timestamp 466 also received from the observing entity. If the time difference exceeds a threshold value (e.g. the rotation rate), then the observing entity may be denied the authentication of the beacon device and/or the additional information associated with the beacon device.

As yet another example, if a time difference between the current time and the device reception timestamp 466 exceeds a threshold value, then the observing entity's reception of the message integrity code 462 may be designated as stale and the verifying entity may deny access to the authentication of the beacon device and/or the additional information associated with the beacon device.

In yet further embodiments of the present disclosure, the verifying entity can perform operations to address beacon device clock drift. As an example, in some embodiments, the verifying entity can maintain a beacon clock correction factor for each of the beacon devices. The beacon clock correction factor for each beacon device can describe an offset between the clock of the verifying entity 486 and the counter of such beacon device. The beacon clock correction factor can be a single value or can be a complex function that provides a time-varying relationship (e.g. includes a scaling factor).

In some embodiments, the beacon clock correction factor can be updated (shown at 488) by a verifying entity based at least in part on the message integrity code 462 and the device reception timestamp 466. As an example, updating the beacon clock correction factor can include identifying the expected time-count 480 used to generate the expected message integrity code to which the received message integrity code 462 was matched at 482. The beacon clock correction factor can be updated based at least in part on a comparison of the expected time-count 480 with the device reception timestamp 466.

In such fashion, shared secrets between the beacon devices and the verifying entity can be leveraged to provide authentication of a given beacon device to authorized observing entities. Furthermore, the received message integrity codes can be used to maintain or update the shared sense of time between the verifying entity and the beacon devices.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

Furthermore, as used herein, the term "computing device" refers to an electronic device for storing and processing data. Each computing device can include one or more processors and a memory. The memory can store instructions that, when implemented by the one or more processors, cause the one or more processors to perform operations to provide functionality. In addition, in some instances computing devices can implement one or more modules to provide certain functionality. The term "module" refers to computer logic utilized to provide desired functionality. Thus, a module can be implemented in hardware, firmware and/or software controlling a general purpose processor. In one embodiment, the modules are program code files stored on the storage device, loaded into memory and executed by a processor or can be provided from computer program products, for example, computer executable instructions that are stored in a tangible computer-readable storage medium such as RAM hard disk or optical or magnetic media.

While the present subject matter has been described in detail with respect to specific example embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for authenticating beacon devices, the method comprising:
   receiving, by one or more computing devices, a static identifier and a message integrity code from an observing entity, the observing entity having previously received the static identifier and the message integrity code from a beacon device, wherein the message integrity code comprises a time-varied obscuration of the static identifier associated with the beacon device;
   determining, by the one or more computing devices, a validity of the message integrity code by matching the message integrity code versus a plurality of expected message integrity codes, generating the plurality of expected message integrity codes associated with the static identifier, and determining whether the received message integrity code matches any of the expected message integrity codes, wherein the message integrity code is valid if it matches any of the expected message integrity codes, and wherein generating the plurality of expected message integrity codes associated with the static identifier comprises generating a plurality of expected time-modified identifiers based at least in part on a time-count list, generating a plurality of expected message integrity code precursors based at least in part on a rotation key associated with the static identifier and the plurality of expected time-modified identifiers, and generating the plurality of expected message integrity codes based at least in part on the plurality of expected message integrity code precursors; and
   when the message integrity code is determined to be valid, providing, by the one or more computing devices, the observing entity with an authentication of the beacon device.

2. The computer-implemented method of claim 1, wherein providing, by the one or more computing devices, the observing entity with the authentication of the beacon device comprises providing, by the one or more computing devices, the observing entity with semantic information associated with the beacon device.

3. The computer-implemented method of claim 1, wherein the obscuring function comprises a block cipher.

4. The computer-implemented method of claim 1, wherein the plurality of expected time-counts are selected from the time-count list based at least in part on a device reception timestamp that indicates a time at which the observing entity received the message integrity code from the beacon device.

5. The computer-implemented method of claim 1, wherein each of the expected message integrity codes is determined according to an algorithm that uses a plurality of shared secrets between each of the plurality of beacon devices and a verifying entity determining the expected message integrity codes.

6. The computer-implemented method of claim 5, wherein the plurality of shared secrets between each of the plurality of beacon devices and the verifying entity determining the expected message integrity codes comprise at least a plurality of rotation keys respectively associated with the plurality of beacon devices.

7. The computer-implemented method of claim 1, further comprising updating, by the one or more computing devices, a beacon clock correction factor based at least in part on the message integrity code and a device reception timestamp also received from the observing entity, the device reception timestamp indicating a time at which the observing entity received the message integrity code from the beacon device.

8. The computer-implemented method of claim 7, wherein updating, by the one or more computing devices, the beacon clock correction factor based at least in part on the message integrity code and the device reception timestamp comprises:
   identifying, by the one or more computing devices, an expected time-count used to generate the expected message integrity code to which the received message integrity code was matched; and
   updating, by the one or more computing devices, the beacon clock correction factor based at least in part on a comparison of the expected time-count to the device reception timestamp.

9. The computer-implemented method of claim 1, further comprising:
   identifying, by the one or more computing devices, an expected time-count used to generate the expected message integrity code to which the received message integrity code was matched; and
   determining, by the one or more computing devices, a time difference between the expected time-count used to generate the expected message integrity code to which the received message integrity code was matched and a device reception timestamp also received from the observing entity, the device reception timestamp indicating a time at which the observing entity received the message integrity code from the beacon device;
   wherein the beacon device is authenticated to the observing entity only when the time difference is less than or equal to a threshold value.

* * * * *